(12) United States Patent
Obrador

(10) Patent No.: US 7,388,605 B2
(45) Date of Patent: Jun. 17, 2008

(54) STILL IMAGE CAPTURING OF USER-SELECTED PORTIONS OF IMAGE FRAMES

(75) Inventor: Pere Obrador, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1093 days.

(21) Appl. No.: 10/292,660

(22) Filed: Nov. 12, 2002

(65) Prior Publication Data

US 2004/0090548 A1    May 13, 2004

(51) Int. Cl.
H04N 5/225 (2006.01)
H04N 5/262 (2006.01)
H04N 5/222 (2006.01)

(52) U.S. Cl. .............................. 348/220.1; 348/240.2; 348/333.03; 386/120

(58) Field of Classification Search ............. 348/220.1, 348/208.6, 208.14, 240.2, 333.03, 14.14; 386/120, 121
See application file for complete search history.

(56) References Cited

U.S. PATENT DOCUMENTS

| | | | |
|---|---|---|---|
| 4,603,966 A | 8/1986 | Brownstein | |
| 5,777,626 A | 7/1998 | Takashima et al. | |
| 5,923,908 A * | 7/1999 | Schrock et al. | 396/85 |
| 6,304,271 B1 | 10/2001 | Nehme | |
| 6,317,141 B1 | 11/2001 | Pavley et al. | |
| 6,476,868 B1 * | 11/2002 | Kaji et al. | 348/333.02 |
| 6,624,846 B1 * | 9/2003 | Lassiter | 348/211.4 |
| 6,833,863 B1 * | 12/2004 | Clemens | 348/220.1 |
| 6,906,746 B2 * | 6/2005 | Hijishiri et al. | 348/333.03 |
| 6,919,927 B1 * | 7/2005 | Hyodo | 348/333.02 |
| 6,961,083 B2 * | 11/2005 | Obrador et al. | 348/220.1 |
| 6,992,707 B2 * | 1/2006 | Obrador | 348/220.1 |
| 7,034,881 B1 * | 4/2006 | Hyodo et al. | 348/333.02 |
| 7,224,393 B2 * | 5/2007 | Ojima et al. | 348/333.03 |
| 2001/0010561 A1 * | 8/2001 | Nagai | 348/333.03 |
| 2002/0080251 A1 * | 6/2002 | Moriwaki | 348/333.03 |
| 2002/0101517 A1 * | 8/2002 | Leppisaari et al. | 348/333.03 |
| 2003/0071904 A1 * | 4/2003 | Karasaki et al. | 348/240.2 |
| 2003/0160874 A1 * | 8/2003 | Kuroiwa | 348/220.1 |
| 2005/0146623 A1 * | 7/2005 | Juen | 348/220.1 |

\* cited by examiner

Primary Examiner—John M. Villecco

(57) ABSTRACT

Image capture systems and methods are described. In one aspect, an image capture system includes an image sensor, an image frame generator, and an image region selector. The image sensor is operable to generate raw image data from a viewed scene. The image frame generator is operable to generate image frames from the raw image data. The image region selector is operable to cause a user-selected portion of an image frame to be captured as a still image in response to user input.

4 Claims, 4 Drawing Sheets

STILL IMAGE CAPTURING OF USER-SELECTED PORTIONS OF IMAGE FRAMES

CROSS-REFERENCE TO RELATED APPLICATIONS

This application relates to the following co-pending applications, each of which is incorporated herein by reference: U.S. patent application Ser. No. 10/023,808, filed Dec. 21, 2001, by Pere Obrador et al. and entitled "Concurrent Dual Pipeline For Acquisition, Processing And Transmission Of Digital Video And High-resolution Digital Still Photographs;" and U.S. patent application Ser. No. 10/023,951, filed Dec. 21, 2001, by Pere Obrador et al. and entitled "Remote High-resolution Photography And Video Recording Using A Streaming Video As A View-Finder."

TECHNICAL FIELD

This invention relates to image capture systems and methods.

BACKGROUND

Image capture systems may capture images in an analog format (e.g., 35 millimeter SLR cameras) or a digital format (e.g., digital still cameras, digital video cameras, and hybrid digital video cameras). Digital still cameras are operable to capture high-resolution still photographs. Digital video cameras are operable to capture video clips (or image frame sequences). Hybrid digital video cameras (or multimedia recorders) are operable to capture both high-resolution still images and video frame sequences. Each of the digital still cameras, digital video cameras, and hybrid digital video cameras typically includes a display screen. In a capture mode of operation, a user may view images of an object or a scene in the display screen before and during image capture. In a playback mode of operation, a user may review previously captured still images and video clips in the screen.

Still images that are captured by known hybrid digital video cameras may be cropped in one of two ways: on-line or off-line. Still images may be cropped on-line by focusing the hybrid digital video camera so that a particular object or scene is properly positioned and framed in a viewfinder or on the display screen. Still images may be cropped off-line by transferring the still image data to a special purpose image editing device or to a general purpose computer running an image editing software application program.

SUMMARY

In one aspect, the invention features an image capture system that includes an image sensor, an image frame generator, and an image region selector. The image sensor is operable to generate raw image data from a viewed scene. The image frame generator is operable to generate image frames from the raw image data. The image region selector is operable to cause a user-selected portion of an image frame to be captured as a still image in response to user input.

In another aspect, the invention features an image capture method in accordance with which raw image data is generated from a viewed scene. Image frames are generated from the raw image data. A user-selected portion of an image frame is captured as a still image Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. System Overview

Figure 1:
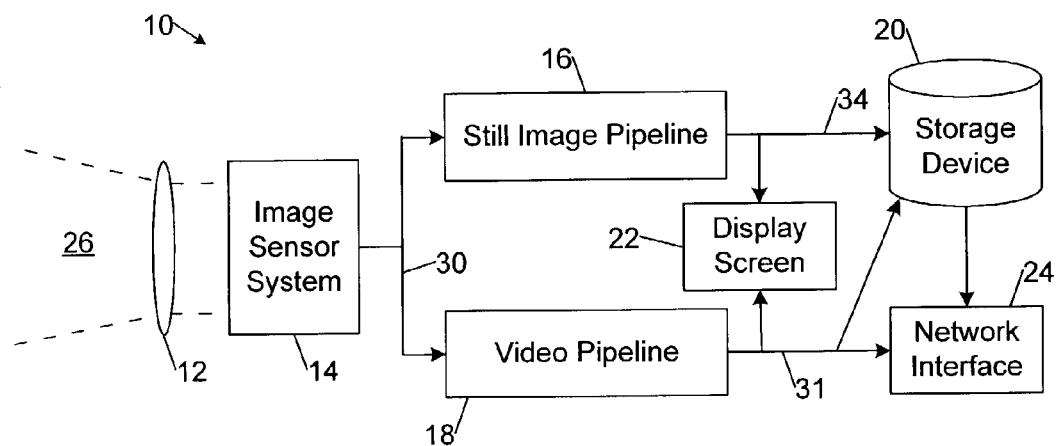
FIG. 1 is block diagram of an image capture system embodiment.
Figure 2:
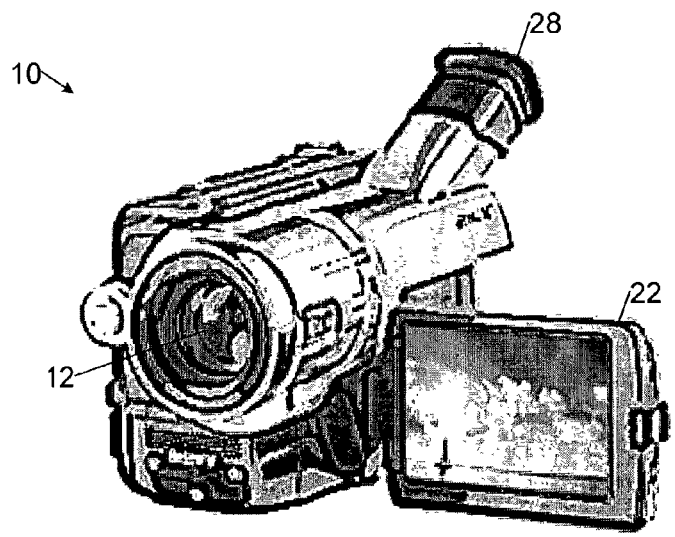
FIG. 2 is a diagrammatic perspective view of the image capture system of FIG. 1.
Figure 3:
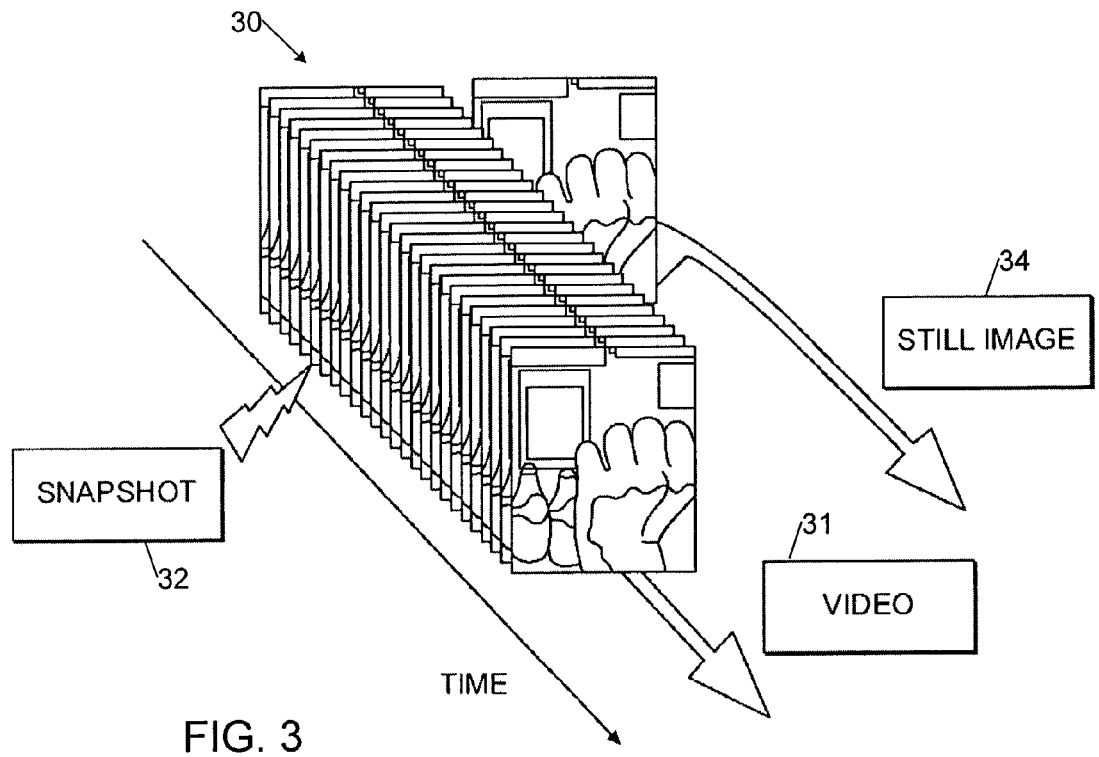
FIG. 3 is a diagrammatic view of image frames generated by the image capture system embodiment of FIG. 1.

Referring to FIGS. 1-3, in one embodiment, an image capture system 10 includes a lens 12, an image sensor system 14, a still image pipeline 16, a video pipeline 18, a storage device 20, a display screen 22, and a network interface 24. In operation, light 26 from an object or a scene is focused by lens 12 onto an image sensor (e.g., a charge coupled device (CCD) or a complementary metal-oxide-semiconductor (CMOS) image sensor) of image sensor system 14. Image sensor system 14 is operable to convert raw image data into image frames 30 at a rate of, for example, 30 frames per second. As explained in detail below, the still image pipeline 16 is operable to process the image frames 30 into high-resolution still images and the video frame pipeline 18 is operable to process the image frames 30 into video frames. In some embodiments, the video frame pipeline 18 is operable to run concurrently with the still image pipeline 16.

A user may view a scene on display screen 22 or through an optical viewfinder 28. In response to user input, video frames 31 may be captured and stored in the storage device 20, which may be a conventional storage device, including a hard disk drive, a floppy disk drive, a CD-ROM drive, and a nonvolatile data storage device. During video frame acquisition, a snapshot 32 may be taken to capture a particular high-resolution still image 34. During the high-resolution still image acquisition process, video frames 31 may be stored temporarily (i.e., buffered) in a frame buffer. Each of the image frames 30 contains sufficient information to generate high-resolution still image 34. When a high-resolution (e.g., 1536×1024 pixels) still image 34 is not being captured, however, only the video pipeline 18 is running, preferably at a medium resolution (e.g., 720×480 pixels). When the user wants to capture a high-resolution still image corresponding to an image frame, the same image frame may be processed in both the video pipeline 18 and the high-resolution still image pipeline 16.

Figure 4:
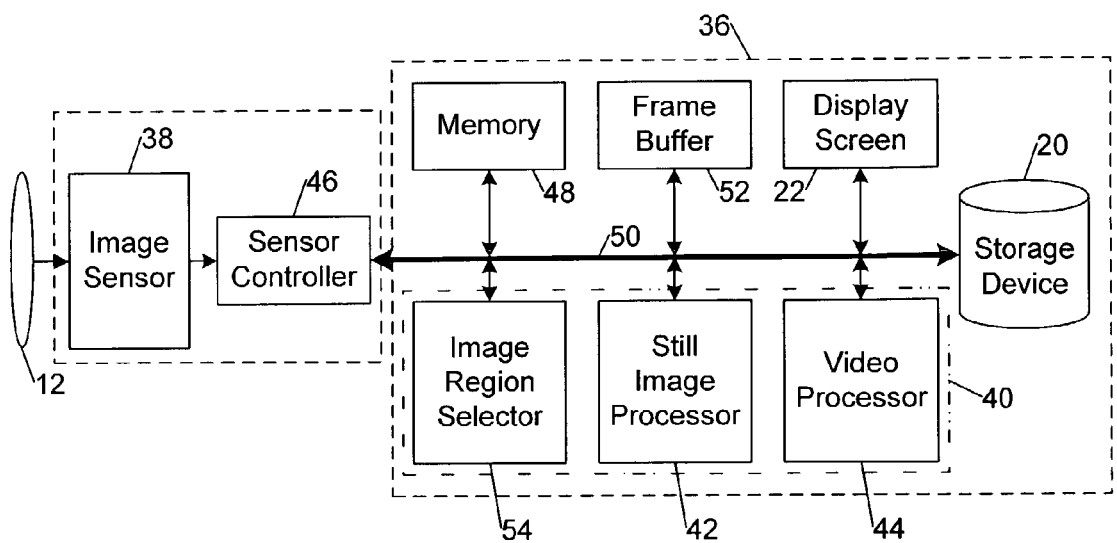
FIG. 4 is a block diagram of an exemplary implementation of the image capture system embodiment of FIG. 1.

Referring to FIG. 4, one exemplary implementation of image capture system 10 utilizes only one hardware processing pipeline 36 with one image sensor 38 and a processing system 40. The single hardware processing pipeline 36 supports a still image processor 42 and a video processor 44. A sensor controller 46 generates high-resolution image frames 30 from the raw image data generated by image sensor 38. The sensor controller 46 may transfer the image frames over a data bus 50 to a memory 48 (e.g., a random access memory (RAM)) for storage. Still image processor 42 is operable to generate high-resolution still images 34 from the stored image frames 30. The video processor 44 is operable to generate video frames from the stored image frames 30 by down-sampling, demosaicing, and color-correcting the stored image frames 30. The video processor 44 also may compress the processed image frames and transmit the resulting video frames to display screen 22.

As mentioned above, in some embodiments, the video and still image processors 42, 44 may operate concurrently (i.e., high-resolution still image photographs 34 may be captured while video is being recorded), as follows. The image frames that are generated by sensor controller 46 are stored initially in memory 48. The video processor 44 may down-sample the stored image frames 30 and transmit the down-sampled image frames 30 to a frame buffer 52. The frame buffer 52 stores the down-sampled image frames 30 temporarily before they are further processed by video processor 44. During video frame buffering, the still image processor 42 may process a stored image frame 30 into a high-resolution still image 34. After the high-resolution still image 34 has been processed and transmitted to network interface 24 and/or stored in storage device 20, the video processor 44 processes the image frames 30 that are stored and accumulated in the frame buffer 52. The resulting video frames are transmitted to the display screen 22 or the storage device 20, or both. At the same time, new image frames 30 may be acquired and stored in memory 48. In general, the video processor 44 should be operable to clear the frame buffer 52 at a rate that is faster than the rate at which the image frames 30 are acquired. After the frame buffer 52 has been emptied, another high-resolution still image 34 may be captured. Thus, in these embodiments, the frequency at which high-resolution still images may be captured depends on processor speed and the size of frame buffer 52.

In some embodiments, image frames 30 may be stored directly in storage device 20. In these embodiments, these stored image frames 30 may be processed into high-resolution still images at a later time (e.g., when sufficient processing resources become available, such as after video frames processing has terminated).

Additional details about the construction, operation, and alternative implementations of image capture system 10 may be obtained from U.S. patent application Ser. No. 10/023,808, filed Dec. 21, 2001, by Pere Obrador et al. and entitled "Concurrent Dual Pipeline For Acquisition, Processing And Transmission Of Digital Video And High-resolution Digital Still Photographs."

II. Real-Time Capture of User-Selected Portions of Image Frames

Referring to FIG. 4, processing system 40 further includes an image region selector 54 that is operable to enable a user to select a portion of an image frame 30 to be captured as a still image. In this way, a properly cropped still image may be captured while a video clip is being captured without disrupting the video scene being captured (e.g., by zooming in and focusing the video camera onto an object or scene of interest).

Figure 5A:
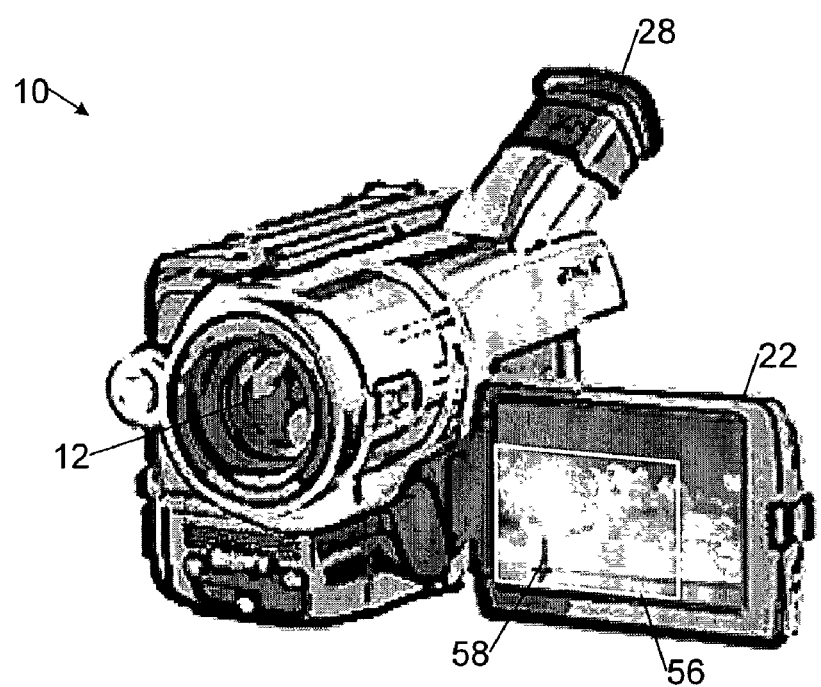
FIG. 5A is a diagrammatic perspective view of the image capture system embodiment of FIG. 2 with a image region selection box centered at a user-selected location on a display screen.
Figure 5B:
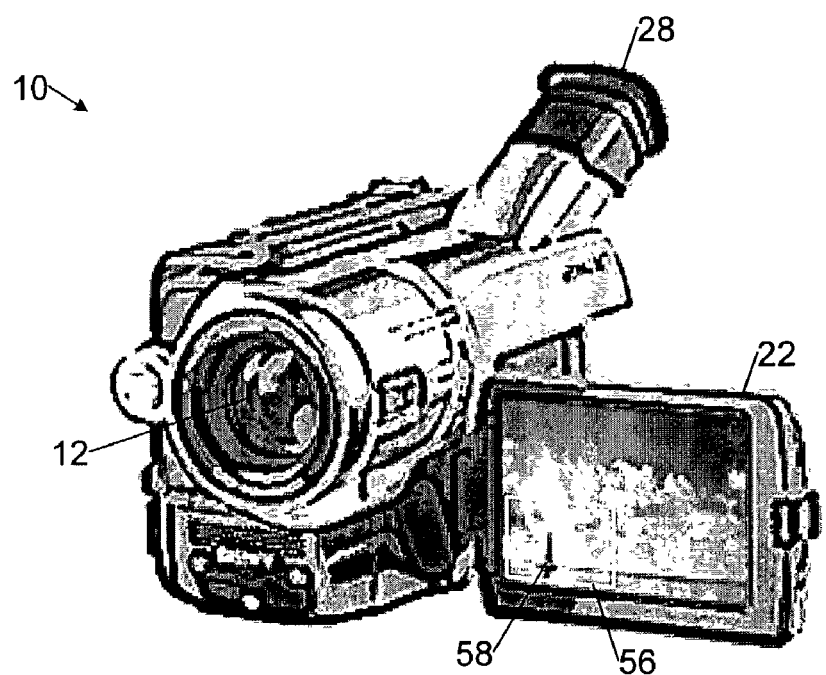
FIG. 5B is a diagrammatic perspective view of the image capture system embodiment of FIG. 5A with a smaller image region selection box centered at the user-selected location on the display screen.

Referring to FIGS. 5A and 5B, in some embodiments, the display screen 22 may include a touch screen (e.g., a resistive-type touch screen or a capacitive-type touch screen) and the image region selector 54 is operable to receive user commands through the touch screen. In particular, image region selector 54 is operable to cause a image region selection box 56 to be displayed on the display screen 22 centered at a location touched by a user (or a stylus). For example, as shown in FIG. 5A, image region selector 54 is operable to cause image region selection box 56 to be displayed in response to a touch of the touch screen at a location to the right of the sail boat 58. The image region selector 54 is operable to direct the still image processor 42 to capture an image frame region demarcated by the image region selection box 56 as a still image in response to a user command to capture the still image.

As shown in FIG. 5B, the image region selector 54 is operable to incrementally change the image region selection box size in response to repeated touches of the touch screen at a user-selected location. For example, if a user touches the touch screen at the same location near the sail boat 58 a second time, the size of image region selection box 56 is reduced from the original size shown in FIG. 5A. In general, in response to repeated touches at the same display screen location, the image region selector 54 is operable to incrementally decrease the image region selection box size from a predetermined maximum size to a predetermined minimum size and to incrementally increase the image region selection box size from the predetermined minimum size to the predetermined maximum size. In some embodiments, a user may directly control the size of the image region selection box by dragging one or more corners or sides of the image region selection box 56 to desired locations.

In some other embodiments, which may or may not include a touch screen, a user may control the location and size of the image region selection box 56 through a user interface. In these embodiments, the user interface may include, for example, one or more push buttons and a joystick. The joystick may be used to move image region selection box 56 to a desired location on display screen 56 and the one or more push buttons may be used to control the size of image region selection box 56.

Figure 6A:
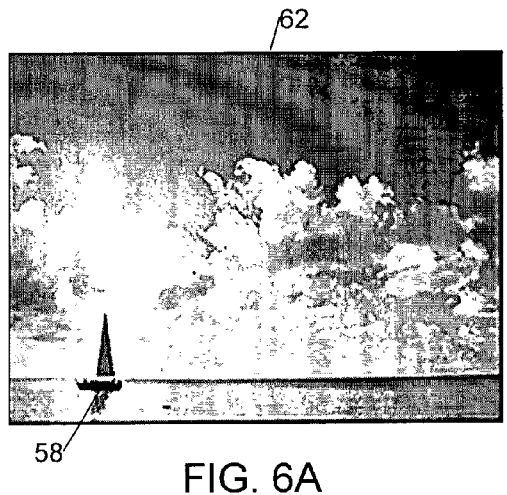
FIG. 6A is a high-resolution image frame.
Figure 6B:
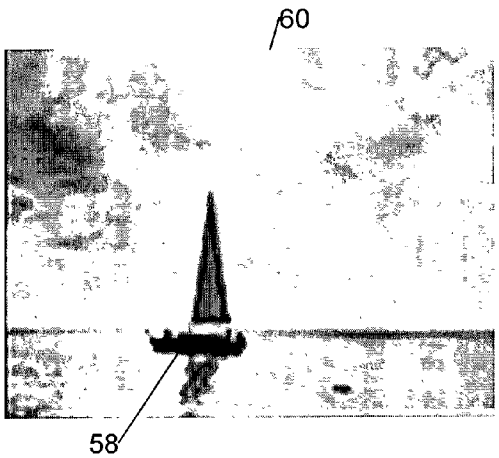
FIG. 6B is a high-resolution still image corresponding to a user-selected portion of the image frame of FIG. 6A.

As shown in FIGS. 6A and 6B, image region selector 54 enables a user to capture a properly cropped still image 60 while a video clip is being captured without disrupting the captured video scene by, for example, zooming in and focusing the video camera onto an object or scene of interest. This allows the user to capture a video clip from a desired perspective (e.g., a view of the sail boat 58 as it sails from one end of the display screen to the other) and, at the same time, discard parts of a scene in an image frame 62 to obtain a high-resolution still image 60 that focuses on a desired object (e.g., sail boat 58) or a desired part of the scene.

Figure 7:
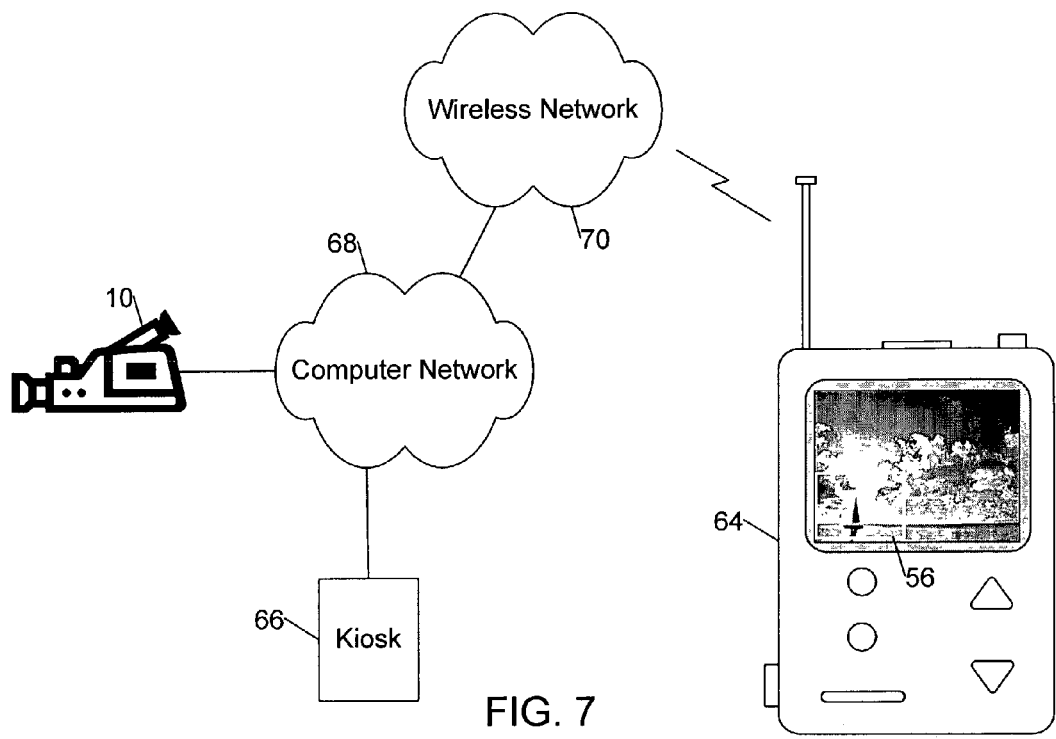
FIG. 7 is a diagrammatic view of an image capture system embodiment transmitting image frames to remote client terminals.

III. Real-Time Capture of User-Selected Portions of an Image Frame from Remote Locations Referring to FIG. 7, in some embodiments, video frames that are captured by image capture system 10 may be transmitted through network interface 24 to one or more remote client terminals 64, 66 over one or more networks, including a computer network 68 and a wireless network 70. For example, in the illustrated embodiment, a user may preview video frames that are acquired by image capture system 10 using a handheld computer 64 with a wireless connection to wireless network 70 or a kiosk 66 with a wired connection to computer network 68. In these embodiments, image region selector 54 may be controlled remotely by user commands that are input through handheld computer 64 or kiosk 66. After a user has positioned image region selection box 56 with a desired size at a desired location, the user may transmit a command to capture a still image corresponding to a portion of a current image frame that is demarcated by the image region selection box 56. The resulting cropped, high-resolution still image then may be transmitted to the handheld computer 64 or kiosk 66, or transmitted to some other location (e.g., to a web site or an e-mail account).

IV. Conclusion

Other embodiments are within the scope of the claims. For example, the above embodiments are described in connection with a concurrent dual video and still image pipeline that is capable of simultaneously capturing digital video frames and high-resolution digital still images. These embodiments, however, readily may be incorporated in other kinds of hybrid digital video cameras.

The systems and methods described herein are not limited to any particular hardware or software configuration, but rather they may be implemented in any computing or processing environment, including in digital electronic circuitry or in computer hardware, firmware, or software. For example, the various components of processing system 40 may be implemented, in part, in a computer program product tangibly embodied in a machine-readable storage device for execution by a computer processor. In some embodiments, these software components preferably are implemented in a high level procedural or object oriented programming language; however, the algorithms may be implemented in assembly or machine language, if desired. In any case, the programming language may be a compiled or interpreted language. The image capture methods described herein may be performed by a computer processor executing instructions organized, e.g., into program modules to carry out these methods by operating on input data and generating output. Suitable processors include, e.g., both general and special purpose microprocessors. In some embodiments, one or more of the components of processing system 40 are implements in one or more of application specific integrated circuits (ASICs) or digital signal processors (DSPs), or both.

What is claimed is:

1. An image capture system, comprising:
    an image sensor operable to generate raw image data from a viewed scene;
    an image frame generator operable to generate image frames from the raw image data;
    a display screen operable to display image frames generated by the image frame generator, wherein the display screen comprises a touch screen and the image region selector is operable to receive user commands through the touch screen; and
    an image region selector operable to cause a user-selected portion of an image frame to be captured as a still image in response to user input, wherein the image region selector is operable to receive user commands to select a portion of an image frame, cause an image region selection box to be displayed on the display screen centered at a touched location, and incrementally change the image region selection box size in response to repeated touches of the touch screen at a user-selected location.

2. The system of claim 1, wherein the image region selector is operable to incrementally decrease the image region selection box size from a maximum size to a minimum size in response to repeated touches of the touch screen at the user-selected location.

3. The system of claim 1, wherein the image region selector is operable to incrementally increase the image region selection box size from a minimum size to a maximum size in response to repeated touches of the touch screen at the user-selected location.

4. An image capture method, comprising:
    generating raw image data from a viewed scene;
    generating image frames from the raw image data;
    displaying image frames generated from the raw image data;
    receiving through a touch screen user commands to select a portion of an image frame;
    displaying an image region selection box centered at a touched location of the touch screen;
    incrementally changing the image region selection box size in response to repeated touches of the touch screen at a user-selected location; and
    capturing a user-selected portion of an image frame demarcated by the image region selection box as a still image.

* * * * *